(12) United States Patent
Hoareau et al.

(10) Patent No.: US 10,215,581 B2
(45) Date of Patent: Feb. 26, 2019

(54) INTELLIGENT VEHICLE NAVIGATION ASSISTANCE

(71) Applicant: International Business Machines Corporation, Armonk, NY (US)

(72) Inventors: Guillaume Hoareau, Montpellier (FR); Johannes J. Liebenberg, Sandton (ZA); John G. Musial, Newburgh, NY (US); Todd R. Whitman, Bethany, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/196,942

(22) Filed: Jun. 29, 2016

(65) Prior Publication Data
US 2018/0003518 A1    Jan. 4, 2018

(51) Int. Cl.
G01C 21/36 (2006.01)
G01C 21/34 (2006.01)

(52) U.S. Cl.
CPC ..... *G01C 21/3641* (2013.01); *G01C 21/3484* (2013.01); *G01C 21/3629* (2013.01)

(58) Field of Classification Search
None
See application file for complete search history.

(56) References Cited

U.S. PATENT DOCUMENTS

| 5,475,599 | A | 12/1995 | Yokoyama et al. |
| 5,844,505 | A | 12/1998 | Van Ryzin |
| 2006/0069500 | A1* | 3/2006 | Hashizume ........ G01C 21/3641 701/410 |
| 2009/0306886 | A1* | 12/2009 | Mueller ............. G01C 21/3641 701/533 |
| 2013/0054134 | A1* | 2/2013 | Wang ................. G01C 21/3484 701/424 |
| 2014/0100780 | A1* | 4/2014 | Caine ................ G01C 21/3641 701/533 |
| 2014/0379261 | A1* | 12/2014 | Karumuri .......... G01C 21/3641 701/540 |
| 2015/0032424 | A1 | 1/2015 | Gupta et al. |

(Continued)

FOREIGN PATENT DOCUMENTS

| EP | 2466260 A1 | 6/2012 |
| EP | 2947423 A1 | 11/2015 |

*Primary Examiner* — David P. Merlino
(74) *Attorney, Agent, or Firm* — Cantor Colburn LLP

(57) ABSTRACT

An aspect of vehicle navigation assistance includes generating a route based on a starting point of a vehicle and a user-inputted destination location. The route specifies a set of directions defined by location points, actions, and distance values. An aspect also includes comparing the generated route to previously travelled routes stored in the memory, identifying, from the comparing, a segment of the generated route that is in common with a segment from at least one of the previously travelled routes, and determining a frequency count indicating a number of instances that the segment of the generated route appears in the previously travelled routes. A further aspect includes upon determining that the frequency count exceeds a specified threshold value, muting output of audio-based directions through a speaker of the vehicle during traversal of the vehicle through the segment of the generated route.

12 Claims, 4 Drawing Sheets

(56) References Cited

U.S. PATENT DOCUMENTS

| | | | |
|---|---|---|---|
| 2015/0106012 A1* | 4/2015 | Kandangath | G01C 21/3641 701/428 |
| 2015/0253146 A1* | 9/2015 | Annapureddy | G01C 21/3641 701/490 |
| 2017/0122758 A1 | 5/2017 | Rovik et al. | |
| 2017/0122765 A1* | 5/2017 | Boss | G01C 21/3641 |
| 2017/0234690 A1* | 8/2017 | Kandangath | G01C 21/3641 701/428 |
| 2017/0307396 A1* | 10/2017 | So | G01C 21/3641 |

* cited by examiner

INTELLIGENT VEHICLE NAVIGATION ASSISTANCE

BACKGROUND

The invention relates generally to vehicle navigation and, more specifically, to intelligent turn-by-turn vehicle navigation assistance based on a driving history.

Increasingly, global positioning systems (GPSs), handheld devices, and online map routing services provide mechanisms to navigate from one point to another by calculating paths based on information derived from roadway maps. These routing services typically have added features to automatically calculate the type of directions desired. For example, added features may allow an operator to specify routing objectives such as: shortest distance (using an algorithm to determine the shortest distance from one point to the next); least amount of travel time (using an algorithm to determine the shortest distance based on the road's speed limit and distance, and calculating the resulting driving time); least use of freeways; least use of energy (gasoline and/or electricity); and least use of toll roads.

Routing systems typically include cartographic maps and map databases to determine an appropriate driving route. The map databases represent a network of roads and often include information about toll roads, speed limits, highway exit points, and points of interest (POIs). The map databases also include points on a map (also known as waypoints) represented in the form of latitudes and longitudes, universal transverse Mercator (UTM) coordinates, and/or geospatial coordinates. Some examples of waypoints include POIs (e.g., museums, restaurants, railways, exit points, etc.), user-entered destinations, and fixed reference points along a route. These waypoints can be marked on maps in the routing systems.

A route contains a series of two or more waypoints. In order to determine a suggested route, a routing system first determines a set of waypoints between a starting point and a destination point. The routing system then guides a user to a nearest waypoint along the route, then to the next waypoint in the route, and so on, until the user reaches the destination point. A typical routing system resolves the starting point and the destination point into its nearest known waypoints on the network and then uses an algorithm to determine a route between two points. Some routing systems also use a search algorithm to search a graph of nodes (representing waypoints) and edges (representing paths between waypoints). Some examples of search algorithms that can be used to determine a route between two points are Dijkstra's algorithm (to determine the shortest path), an A* algorithm (to determine the shortest path along a weighted graph), and a bi-directional search algorithm.

SUMMARY

According to an embodiment, a vehicle navigation system is provided. The system includes a memory having computer readable computer instructions, and a processor for executing the computer readable instructions. The computer readable instructions include generating a route based on a starting point of a vehicle and a user-inputted destination location. The route specifies a set of directions defined by location points, actions, and distance values. The computer readable instructions also include comparing the generated route to previously travelled routes stored in the memory, identifying, from the comparing, a segment of the generated route that is in common with a segment from at least one of the previously travelled routes, and determining a frequency count indicating a number of instances that the segment of the generated route appears in the previously travelled routes. The computer readable instructions further include, upon determining that the frequency count exceeds a specified threshold value, muting output of audio-based directions through a speaker of the vehicle during traversal of the vehicle through the segment of the generated route.

According to another embodiment, a method is provided. The method includes generating a route based on a starting point of a vehicle and a user-inputted destination location. The route specifies a set of directions defined by location points, actions, and distance values. The method also includes comparing the generated route to previously travelled routes stored in a memory, identifying, from the comparing, a segment of the generated route that is in common with a segment from at least one of the previously travelled routes, and determining a frequency count indicating a number of instances that the segment of the generated route appears in the previously travelled routes. The method further includes, upon determining that the frequency count exceeds a specified threshold value, muting output of audio-based directions through a speaker of the vehicle during traversal of the vehicle through the segment of the generated route.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes generating a route based on a starting point of a vehicle and a user-inputted destination location. The route specifies a set of directions defined by location points, actions, and distance values. The method also includes comparing the generated route to previously travelled routes stored in a memory, identifying, from the comparing, a segment of the generated route that is in common with a segment from at least one of the previously travelled routes, and determining a frequency count indicating a number of instances that the segment of the generated route appears in the previously travelled routes. The method further includes, upon determining that the frequency count exceeds a specified threshold value, muting output of audio-based directions through a speaker of the vehicle during traversal of the vehicle through the segment of the generated route.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Vehicle navigation systems offer useful turn-by-turn directions to drivers who require assistance in locating a desired destination address in an area that is unfamiliar to them. For each waypoint or location point along the designated route, the navigation system presents audible notification of an upcoming direction or change in direction. Oftentimes, a portion of a generated route is familiar to the driver and therefore, such audible instructions are not needed. For example, if a driver initiates various routes from the same starting location, at least a portion of the beginning of the route may be repetitive. In this instance, it may be unnecessary, and even annoying or intrusive, for the driver to receive directions. Further, when using a vehicle integrated navigation system, these audio directions preempt infotainment system features, such as music programming. In addition, these unnecessary instructions can impact safety in that they can become a distraction to the driver. The intelligent vehicle navigation assistance identifies, from a given route, any segments thereof that have been previously driven by the user. The intelligent vehicle navigation assistance identifies a frequency in which the segment has been driven in the past, and when the frequency meets or exceeds a specified threshold value, which indicates the driver is familiar with the location defined by the segment, the intelligent vehicle navigation assistance is instructed to mute the audio directions during the time the vehicle is within that segment. These segments may be identified from a comparison of elements of the generated route to an archive of routes previously used by the driver. For these identified segments, the intelligent vehicle navigation assistance mutes or disables the audible directions and resumes the audible directions thereafter.

In an embodiment, the intelligent vehicle navigation assistance may be configured to distinguish among drivers of a vehicle and provide individual intelligent vehicle navigation assistance services based on each individual's travel patterns. In a further embodiment, the intelligent vehicle navigation assistance may be configured to modify its operation based on detours or other disruptions to a planned route.

Figure 1:
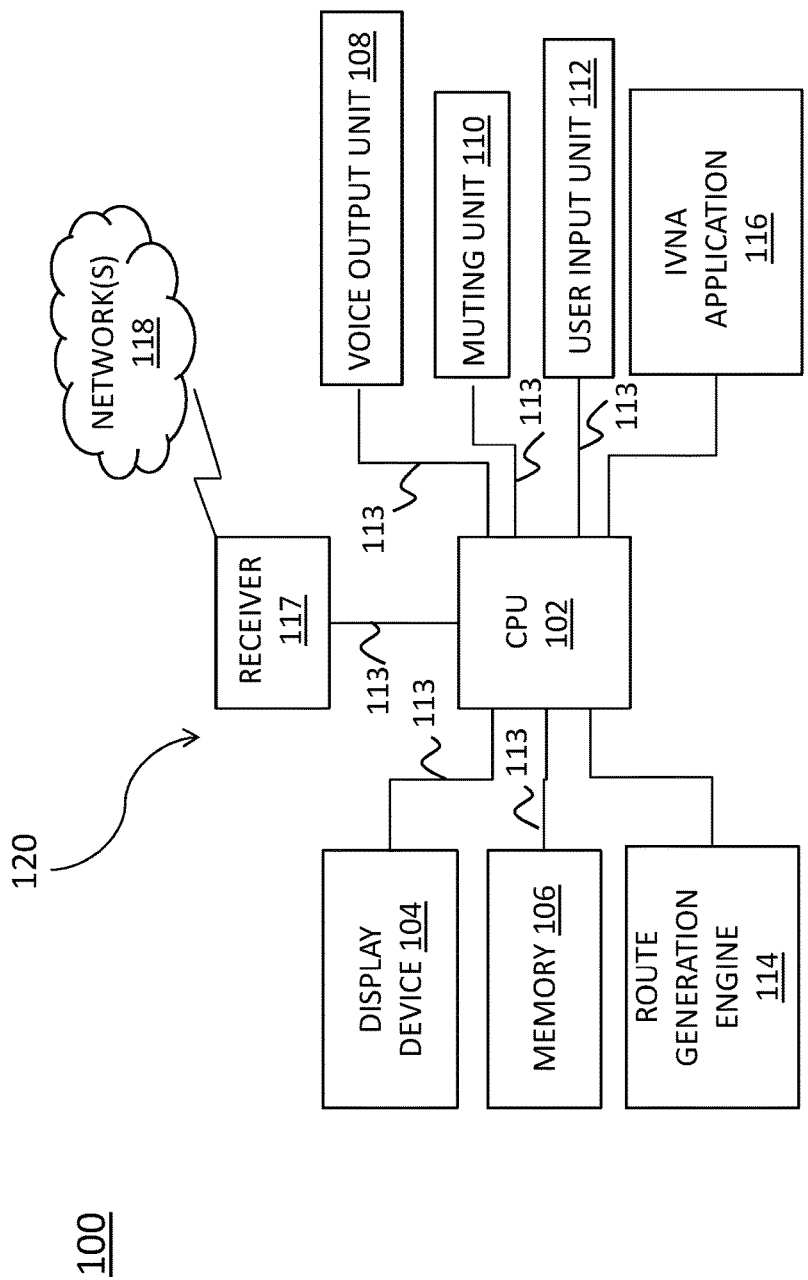
FIG. 1 depicts a system upon which intelligent vehicle navigation assistance may be implemented according to an embodiment of the invention.

Turning now to FIG. 1, a system 100 upon which the intelligent vehicle navigation assistance processes may be implemented will now be described in an embodiment. The system 100 shown in FIG. 1 includes components of a vehicle navigation system 120, which in turn includes a processor 102, a display device 104, a memory 106, a voice output unit 108, a muting unit 110, a user input unit 112, a route generation engine 114, and an intelligent vehicle navigation assistance application 116. These components may be communicatively coupled via one or more communication busses 113, e.g., a data bus.

The vehicle navigation system 120 may be communicatively coupled to one or more communication networks 118 via, e.g., a wireless network interface. In an embodiment, the wireless network interface is a global positioning system (GPS) receiver 117.

The processor 102 is configured to receive inputs (e.g., a desired destination location) from a user via the user input unit 112 and execute the route generation engine 114 and intelligent vehicle navigation assistance application 116 as described herein. In an embodiment, the processor 102 may be integrated into a vehicle control module such as, for example, an infotainment control module or a navigation control module.

The user input unit 112 may be implemented as a keypad or a keyboard for allowing a user to input information, such as a destination address. In an embodiment, the display device 104 may be a liquid crystal display (LCD) screen that is used to display graphics and text. The display screen 104 displays routes generated by the route generation engine 114. Although FIG. 1 illustrates the user input unit 112 and the display device 104 as separate components, it is understood that the user input unit 112 and the display device 104 may be a combined unit as well. For example, in an embodiment the display device 104 is a touchscreen that detects the presence and location of a user's touch.

In an embodiment, the memory 106 stores a database of maps for generating routes. The memory 106 also stores a history of routes driven by a user of the vehicle. In particular, the memory 106 stores routing details corresponding to a user's driving history, which may be from navigation system-generated routes or from any route travelled by the user (i.e., routes in which a navigation system was not employed). Collectively, these routing histories are referred to herein as "previously travelled routes." In a further embodiment, the memory 106 may assign previously travelled routes to one or more drivers. For example, a route travelled by a first driver may be stored along with a tag or indicator that indicates a correspondence between the first user and the route. Likewise, if the same route is travelled by a second individual, the intelligent vehicle navigation assistance identifies the route stored in the memory 106 and adds an additional tag that indicates a correspondence between the route and the second individual. Thus, for each driver of a vehicle that uses the vehicle navigation system 120, the intelligent vehicle navigation assistance can track a history of routes and identifiers that map the routes to specific individuals. A sample data structure for capturing this information may include:

| ROUTE_ID | |
|---|---|
| USER_ID1 | DATE |
| USER_ID2 | DATE |
| ... | |
| USER_IDn | DATE |

Voice output unit 108 may be implemented by one or more speakers. The voice output unit 108 receives voice directions for a given route generated by the route generation engine 114 and outputs the directions through the speakers. The vehicle navigation system 120 monitors, via communications from the receiver 117, a current location or position of the vehicle, and the directions are output within a time frame corresponding to each monitored location of the vehicle. For example, once the vehicle enters an on ramp of a major highway, the vehicle navigation system 120 determines the location of the vehicle and outputs a direction corresponding to the next waypoint or location point in the route (e.g., in 10 miles, take exit 21 off of Interstate 95).

Muting unit 110 receives instructions from the intelligent vehicle navigation assistance application 116 to mute the audible directions coming from the voice output unit 108 and also receives instructions to un-mute the audible directions. The muting unit 110 may be implemented, e.g., in software, as a set of volume control instructions or may be a hardware unit that intercepts communications addressed to the speakers of the voice output unit 108.

The route generation engine 114 includes a mapping tool that takes as input a starting location (e.g., address) and a destination location and returns as output one or more routes to follow to get from the starting location to the destination location subject to routing objectives. The route generation engine 114 accesses a database of maps (e.g., stored in the memory 106) for generating the routes and also stores previously travelled routes. The intelligent vehicle navigation assistance application 116 interfaces with the route generation engine 114 to modify the audible output of directions when a muting condition exists. These features are described further herein.

The route generation engine 114 and intelligent vehicle navigation assistance application 116 may be included with the system 100 in a vehicle at the time of manufacture. It is understood that the route generation engine 114 and the intelligent vehicle navigation assistance application 116 may be implemented as a single application executable by the processor 102 of the vehicle navigation system 120.

The GPS receiver 117 may be in communication with a satellite (not shown) for providing information regarding a current (or starting) location of the vehicle. Alternatively, the current (or starting) location of the vehicle is determined by obtaining user input. Specifically, the user may input current location information into a keypad or keyboard or touch screen of the user input unit 112.

The networks 118 may be any type of known networks in the art. For example, the networks 118 may be a combination of public (e.g., Internet), private (e.g., local area network, wide area network, virtual private network), and may include wireless and wireline transmission systems (e.g., satellite, cellular network, terrestrial networks, etc.).

While the vehicle navigation system 120 is described as being integrated with a vehicle, e.g., in a vehicle control module such as, for example, an infotainment control module or a navigation control module, it will be understood that the navigation system 120 may be implemented by alternative means. For example, aspects of the vehicle navigation system 120 may be implemented on a personal digital device such as, but not limited to, a smart phone or tablet computer.

Figure 2:
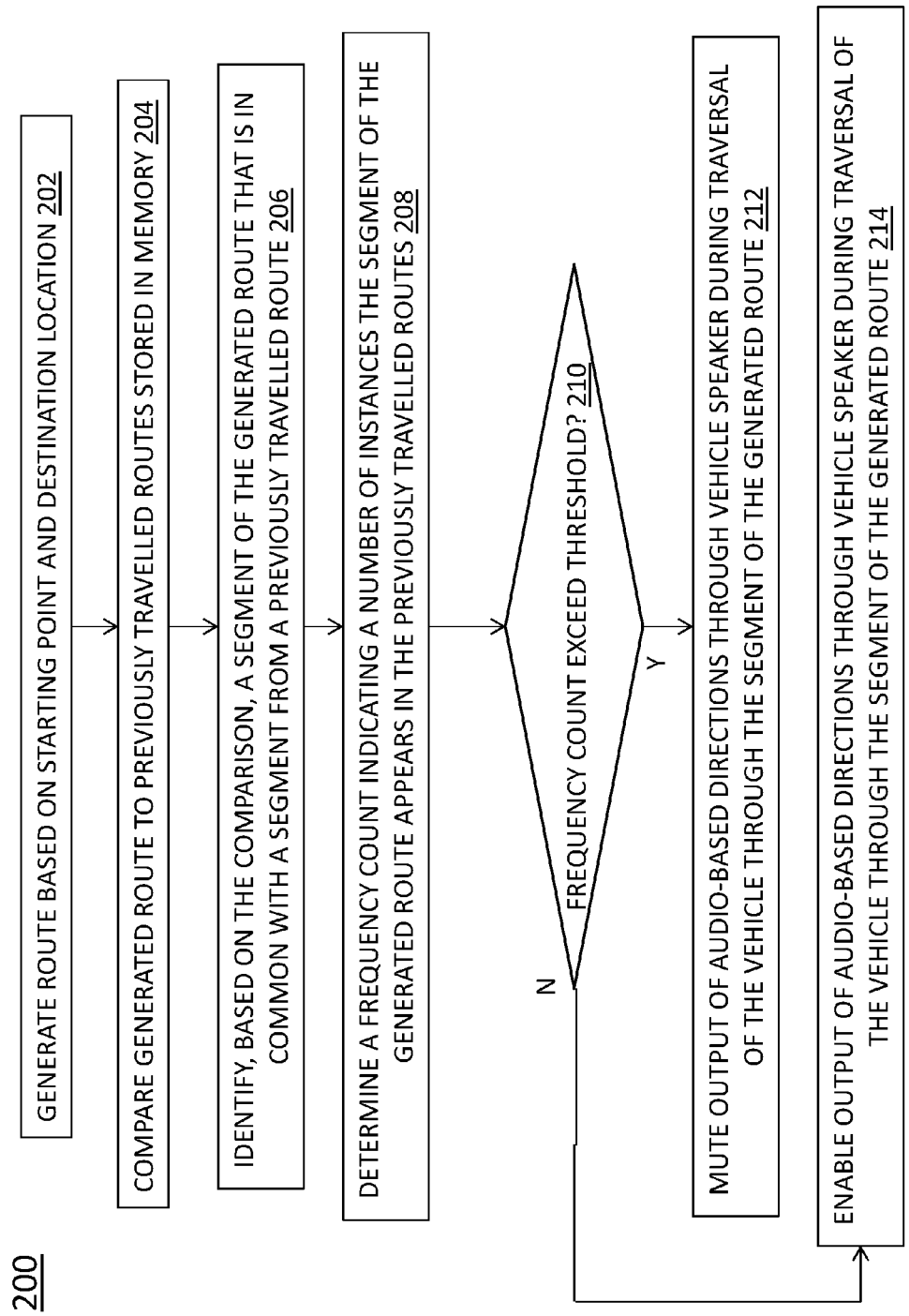
FIG. 2 depicts a flow diagram of a process for providing intelligent vehicle navigation assistance according to an embodiment of the invention.

Turning now to FIG. 2, a flow diagram of a process 200 for implementing the intelligent vehicle navigation assistance will now be described in an embodiment. The process assumes that a driver has entered a vehicle and has entered a destination location into the navigation system 120. The process 200 also assumes that the vehicle's position or location is being monitored and tracked via the receiver 117 through the duration of the generated route.

At block 202, the vehicle navigation system 120 generates a route based on a starting point of a vehicle (e.g., as determined using GPS or through manual entry by the driver) and the destination location. The generated route includes a set of directions defined by location points (waypoints), actions, and distance values. For example, a single direction in a set of directions that comprise the route may be "In ten miles, turn left onto Main Street."

In block 204, the intelligent vehicle navigation assistance application 116 accesses the previously travelled routes stored in the memory 106 and compares the generated route to the previously travelled routes. In one embodiment, the comparison may be implemented by comparing each direction in the set of directions of the generated route to each direction in the set of directions associated with each of the previously travelled routes.

In block 206, the intelligent vehicle navigation assistance application 116 identifies, based on results of the comparison in block 204, a segment of the generated route that is in common with a segment from at least one of the previously travelled routes. The segment is indicated by a sequence of the location points, actions, and distance values in the set of directions. The segment indicates that the vehicle has previously traversed a region defined by this sequence.

In block 208, the intelligent vehicle navigation assistance application 116 determines a frequency count for the segment. The frequency count indicates a number of instances in which the segment appears in the previously travelled routes.

In block 210, the intelligent vehicle navigation assistance application 116 determines whether the frequency count exceeds a pre-defined threshold value. For example, if a vehicle has traversed the same segment more than five times, this may indicate that the driver is familiar with the area defined by the segment. The threshold value for the frequency count may be a configurable value.

Upon determining that the frequency count exceeds the specified threshold value, the intelligent vehicle navigation assistance application 116 mutes the output of audio-based directions through the speakers (e.g., the voice output unit 108) of the vehicle during traversal of the vehicle through the segment of the generated route in block 212.

If, however, the frequency count does not exceed the specified threshold value, the intelligent vehicle navigation assistance application 116 enables the output of the audio-based directions through the speakers for the duration of the segment in block 214.

Figure 3:
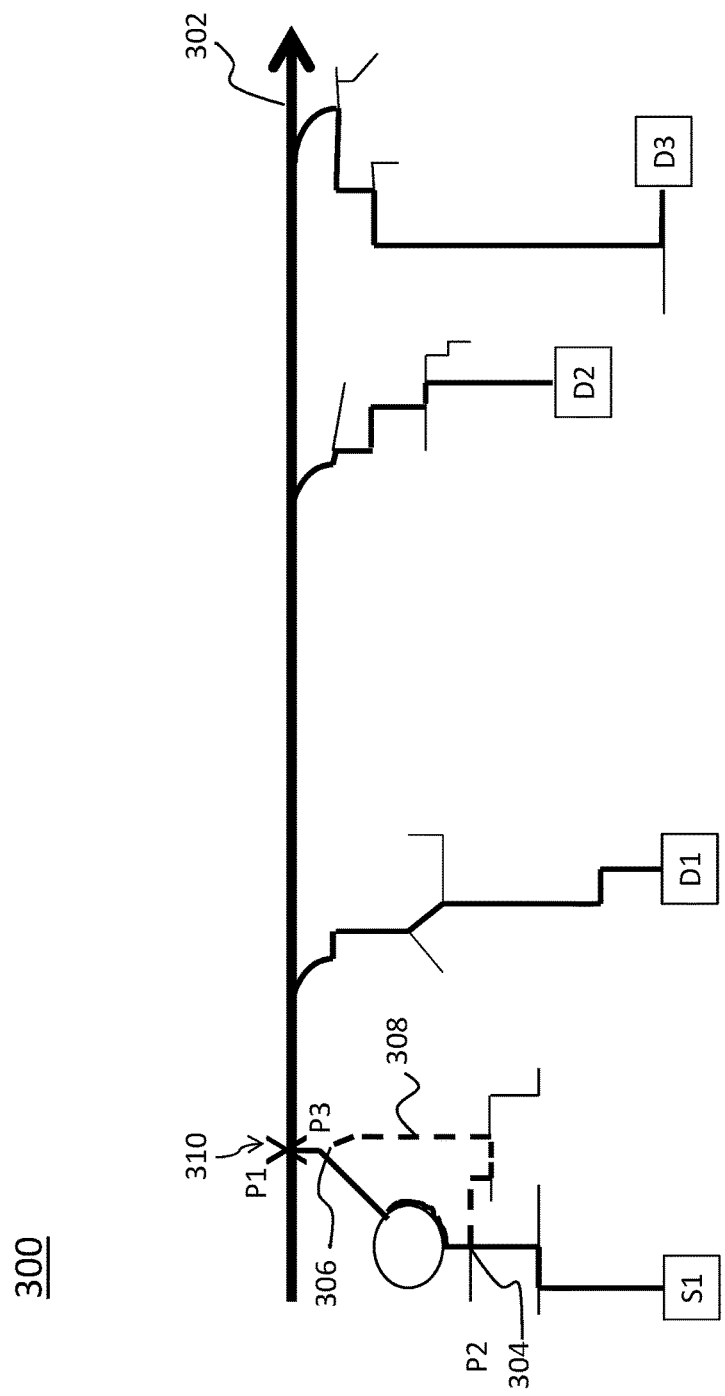
FIG. 3 depicts a map of routes generated by the intelligent navigation assistance processes according to an embodiment of the invention.

Turning now to FIG. 3, a map 300 of previously travelled routes is illustrated and will now be described. In the map 300, a main artery (e.g., an interstate highway, expressway, or turnpike) 302 is shown. A first route is depicted by bold lines from a starting location (S1) to a first destination point (D1). A second route is depicted by bold lines from the same starting location (S1) to a second destination point (D2). A third route is depicted by bold lines from the starting point (S1) to a third destination point (D3). Thus, in the map 300, three routes are depicted, each of which begins from the same starting point and each route overlaps a portion of the main artery 302.

For purposes of illustration, it is supposed that the vehicle has accessed the first route (S1-D1) three times, the second route (S1-D2) two times, and the third route (S1-D3) one time. Also suppose that the threshold value for the frequency count is set at 5. For each route (S1-D1, S1-D2, S1-D3), a common segment is identified as S1-P1. In this example, it may be that the starting location (S1) is the driver's home location and so the driver begins each trip from S1. On the sixth and last trip, the segment S1-P1 has been traversed six times in total. Because this value exceeds the threshold of 5, on the vehicle's sixth trip, the intelligent vehicle navigation assistance application 116 causes the audible directions to be muted for the duration of that segment.

In an embodiment, the intelligent vehicle navigation assistance application 116 may un-mute muted audible directions based on one or more conditions. For example, using the map 300, because the segment defined by S1-P1 is familiar to the driver, the audible directions are generally muted. However, in the event the driver deviates from the route, e.g., a detour indicated in the map 300 as P2 (304) to P3 (306), the intelligent vehicle navigation assistance application 116 may un-mute the muted directions for the duration of the detour P2-P3 to assist the driver in navigating around the detour. The alternate route P2-P3 is depicted generally at 308 in dotted lines. Between P3 and P1, the audible directions are again muted.

Figure 4:
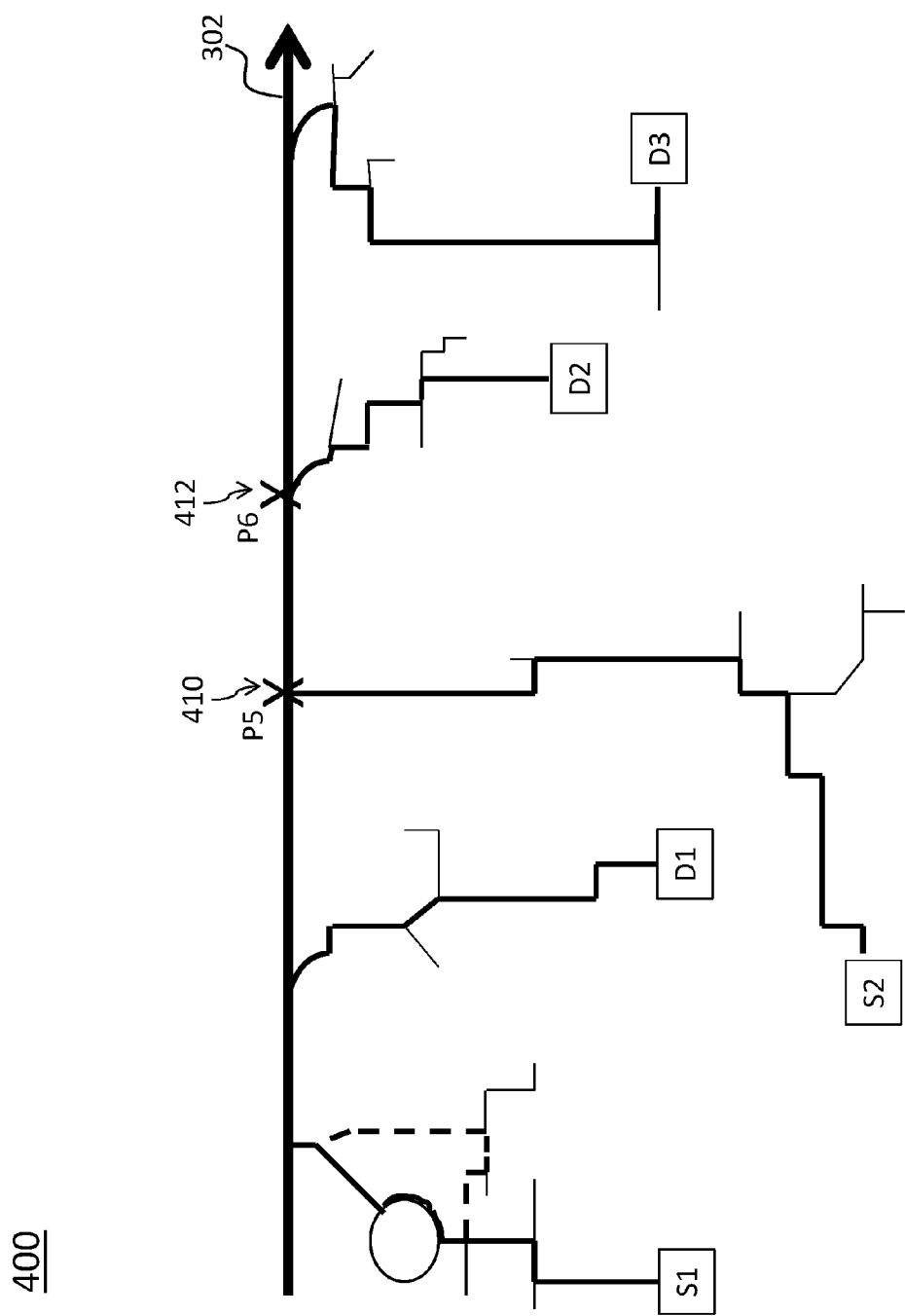
FIG. 4 depicts a map of routes generated by the intelligent navigation assistance processes according to another embodiment of the invention.

Turning now to FIG. 4, a map 400 of previously travelled routes in an alternative embodiment is illustrated and will now be described. In the map 400 the main artery 302 is shown, along with the routes S1-D1, S1-D2, and S1-D3. The map 400 assumes that the frequency count of access of the portion or segment of the route S1-D2, identified as P6 (412) to D2 has been exceeded, such that the audible directions are typically muted for the duration of the segment P6-D2. However, in this embodiment, the vehicle's starting location has changed. For example, the driver may be travelling to a familiar destination but is starting the trip from an unfamiliar location. The driver enters a destination address for D2, and the vehicle navigation system 120 detects the starting position of the vehicle at S2, which is a new starting location. The route generation engine 114 generates a route from S2-D2 and the intelligent vehicle navigation assistance application 116 mutes the audible directions beginning from the point P5 (410).

In an embodiment, the intelligent vehicle navigation assistance application 116 may be configured to track additional parameters associated with the generated routes. For example, the generated route may be stored in the memory 106 along with a timestamp which can be used to determine whether the user may have forgotten or become unfamiliar with a previously known route or segment of a route. For example, suppose the user traveled a segment 20 times in the course of six months and then did not travel the segment at all for the next six months. The intelligent vehicle navigation assistance application 116 recognizes that the frequency count of 5 has been exceeded; however, due to the lapse of time, the intelligent vehicle navigation assistance application 116 may implement one or more actions in response to determining that the user has not traveled a given segment or route for a minimum amount of time. In one embodiment, the intelligent vehicle navigation assistance application 116 may prompt the user via the vehicle navigation system 120 (e.g., display device notification or voice output prompt) to accept or reject an offer to un-mute the audible directions corresponding to this segment or route. The user may then select from the options based on whether the route has become unfamiliar to the user or not. In another embodiment, the intelligent vehicle navigation assistance application 116 may be configured to modify the output of the audible-based directions to a higher level of detail than the existing level associated with the original directions. For example, instead of detailed turn-by-turn directions, the intelligent vehicle navigation assistance application 116 may identify prominent waypoints, such as major highways, cities, and/or landmarks associated with the route.

In a further embodiment, the intelligent vehicle navigation assistance application 116 processes described above can be separately implemented for individual drivers of a vehicle. In this embodiment, the intelligent vehicle navigation assistance application 116 determines the identity of a particular individual who is driving the vehicle. This identification can be performed using techniques, such as biometrics, vehicle presets associated with each driver, or driver-specific input to the navigation system 120. The intelligent vehicle navigation assistance application 116 assigns the driver identification to a driver-initiated route and stores the route along with the identifier in the memory 106. The intelligent vehicle navigation assistance application 116 compares the generated route to previously travelled routes that have the assigned identifier of the driver. In addition, a second frequency count can be calculated for the specific driver. The second frequency count indicates a number of instances that the segment of the generated route appears in the previously travelled routes having the assigned identifier of the driver.

Technical effects and benefits include modifying operation of a vehicle navigation system's audio with respect to turn-by-turn directions based on the vehicle's driving history. Audible directions for frequently traveled routes or segments thereof are muted, while audible directions for less frequently traveled routes or segments are enabled. The modifications can be extended to identified drivers or individuals associated with the vehicle navigation system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A vehicle navigation system, comprising:
a memory having computer readable instructions; and
a processor for executing the computer readable instructions, the computer readable instructions including:
determining an identity of a driver of a vehicle;
generating a route based on a starting point of the vehicle and a user-inputted destination location, the route comprising a set of directions defined by location points, actions, and distance values;
comparing the generated route to previously travelled routes by the driver stored in the memory, wherein the memory stores previously travelled routes of a plurality of drivers of the vehicle;
identifying, from the comparing, a segment of the generated route that is in common with a segment from at least one of the previously travelled routes by the driver;
determining a frequency count indicating a number of instances that the segment of the generated route appears in the previously travelled routes by the driver;
upon determining that the frequency count exceeds a specified threshold value, muting output of audio-based directions through a speaker of the vehicle during traversal of the vehicle through the segment of the generated route;
monitoring movement of the vehicle during the traversal through the segment of the generated route;
upon determining the vehicle has deviated from a direction in the set of directions, un-muting the output of the audio-based directions;
storing a timestamp corresponding to each of the previously travelled routes by the driver; and
upon determining the frequency count exceeds the specified threshold value and a duration of time between a most recent one of the previously travelled routes by the driver having the segment exceeds a specified time threshold as determined from the timestamp, performing at least one of:
prompting the user to maintain the output of the audio-based directions through the speaker; and
modifying the output of the audio-based directions to a higher level of detail than a level of detail associated with the audio-based directions.

2. The vehicle navigation system of claim 1, wherein the comparing the generated route to previously travelled routes by the driver comprises:

comparing each direction in the set of directions of the generated route to each direction in a set of directions associated with each of the previously travelled routes by the driver stored in the memory.

3. The vehicle navigation system of claim 1, wherein the computer readable instructions further include:
assigning an identifier of the driver to the generated route; and
storing the generated route with the identifier in the memory;
wherein the comparing the generated route to previously travelled routes by the driver stored in the memory includes comparing the generated route to only those previously travelled routes of the plurality of drivers having the assigned identifier of the driver.

4. The vehicle navigation system of claim 1, wherein the segment comprises a sequence of the location points, actions, and distance values in the set of directions.

5. A method, comprising:
generating a route based on a starting point of a vehicle and a user-inputted destination location, the route comprising a set of directions defined by location points, actions, and distance values;
determining an identity of a driver of the vehicle;
comparing the generated route to previously travelled routes by the driver stored in a memory, wherein the memory stores previously travelled routes of a plurality of drivers of the vehicle;
identifying, from the comparing, a segment of the generated route that is in common with a segment from at least one of the previously travelled routes by the driver;
determining a frequency count indicating a number of instances that the segment of the generated route appears in the previously travelled routes by the driver;
upon determining that the frequency count exceeds a specified threshold value, muting output of audio-based directions through a speaker of the vehicle during traversal of the vehicle through the segment of the generated route;
monitoring movement of the vehicle during the traversal through the segment of the generated route;
upon determining the vehicle has deviated from a direction in the set of directions, un-muting the output of the audio-based directions;
storing a timestamp corresponding to each of the previously travelled routes by the driver; and
upon determining the frequency count exceeds the specified threshold value and a duration of time between a most recent one of the previously travelled routes by the driver having the segment exceeds a specified time threshold as determined from the timestamp, performing at least one of:
prompting the user to maintain the output of the audio-based directions through the speaker; and
modifying the output of the audio-based directions to a higher level of detail than a level of detail associated with the audio-based directions.

6. The method of claim 5, wherein the comparing the generated route to previously travelled routes by the driver comprises:
comparing each direction in the set of directions of the generated route to each direction in a set of directions associated with each of the previously travelled routes by the driver stored in the memory.

7. The method of claim 5, further comprising:
assigning an identifier of the driver to the generated route; and
storing the generated route with the identifier in the memory;
wherein the comparing the generated route to previously travelled routes by the plurality of drivers stored in the memory includes comparing the generated route to only those previously travelled routes by the driver having the assigned identifier of the driver.

8. A computer program product comprising a computer readable storage medium having program instructions embodied therewith, wherein the computer readable storage medium is not a transitory signal per se, the program instructions executable by a computer processor to cause the computer processor to perform a method, comprising:
determining an identity of a driver of a vehicle;
generating a route based on a starting point of the vehicle and a user-inputted destination location, the route comprising a set of directions defined by location points, actions, and distance values;
comparing the generated route to previously travelled routes by the driver stored in the memory, wherein the memory stores previously travelled routes of a plurality of drivers of the vehicle;
identifying, from the comparing, a segment of the generated route that is in common with a segment from at least one of the previously travelled routes by the driver;
determining a frequency count indicating a number of instances that the segment of the generated route appears in the previously travelled routes by the driver;
upon determining that the frequency count exceeds a specified threshold value, muting output of audio-based directions through a speaker of the vehicle during traversal of the vehicle through the segment of the generated route;
monitoring movement of the vehicle during the traversal through the segment of the generated route;
upon determining the vehicle has deviated from a direction in the set of directions, un-muting the output of the audio-based directions;
storing a timestamp corresponding to each of the previously travelled routes by the driver; and
upon determining the frequency count exceeds the specified threshold value and a duration of time between a most recent one of the previously travelled routes by the driver having the segment exceeds a specified time threshold as determined from the timestamp, performing at least one of:
prompting the user to maintain the output of the audio-based directions through the speaker; and
modifying the output of the audio-based directions to a higher level of detail than a level of detail associated with the audio-based directions.

9. The computer program product of claim 8, wherein the comparing the generated route to previously travelled routes by the driver comprises:
comparing each direction in the set of directions of the generated route to each direction in a set of directions associated with each of the previously travelled routes by the driver stored in the memory.

10. The computer program product of claim 8, wherein the program instructions executable by a computer processor further cause the computer processor to perform:
assigning an identifier of the driver to the generated route; and storing the generated route with the identifier in the memory;

wherein the comparing the generated route to previously travelled routes by the plurality of drivers stored in the memory includes comparing the generated route to only those previously travelled routes by the driver.

11. The computer program product of claim 10, wherein the program instructions executable by a computer processor further cause the computer processor to perform:

determining a second frequency count indicating a number of instances that the segment of the generated route appears in the previously travelled routes of the driver.

12. The computer program product of claim 8, wherein the segment comprises a sequence of the location points, actions, and distance values in the set of directions.

* * * * *